United States Patent [19]

Mueller et al.

[11] 3,909,382

[45] Sept. 30, 1975

[54] METHOD OF RECOVERING ACID VALUES FROM DILUTE STREAMS AND IMPROVED ALKYLENE OXIDE PROCESS USING SAME

[75] Inventors: Andrew G. Mueller, Taylor; Michael Krumpelt, Riverview, both of Mich.; Walter A. Pitteroff, Esslingen (Neckar), Germany; Shyam D. Argade, Woodhaven; Joseph F. Louvar, Lincoln Park, both of Mich.

[73] Assignee: BASF Wyandotte Corporation, Wyandotte, Mich.

[22] Filed: Dec. 9, 1974

[21] Appl. No.: 530,814

[52] U.S. Cl. .............................. 204/180 P; 204/301
[51] Int. Cl.² ........................................ B01D 13/02
[58] Field of Search .................. 204/131, 180 P, 301

[56] References Cited
UNITED STATES PATENTS

| | | | |
|---|---|---|---|
| 2,694,680 | 11/1954 | Katz et al. | 204/180 P |
| 3,318,788 | 5/1967 | Mintz | 204/180 P |
| 3,752,749 | 8/1973 | Chlanda et al. | 204/180 P |
| 3,766,038 | 10/1973 | Beck et al. | 204/180 P |

*Primary Examiner*—Howard S. Williams
*Assistant Examiner*—A. C. Prescott
*Attorney, Agent, or Firm*—John W. Linkhauer; Bernhard R. Swick; Robert E. Dunn

[57] ABSTRACT

It has been found practical to upgrade streams containing relatively small concentrations (about 1 to 3 weight percent) of hydrochloric acid or other strong mineral acid by multi-stage electrodialysis. This discovery has remarkable implications for the whole chemical industry, particularly in view of the increasing importance of ecological considerations. Moreover, it has further been discovered that, at least in some instances, such multi-stage electrodialysis is applicable even to streams containing small amounts of organic impurities that might be expected to foul the membranes of the electrodialytic cells. One such stream is the output of the chlorinator in the production of propylene oxide from propylene via propylene chlorohydrin, a process of substantial importance in the chemical industry and one that in its form before the instant invention has been particularly beset with ecological problems. Electrodialysis of the chlorinator output yields dilute hydrochloric acid which may be upgraded by subsequent distillation and a saponifier-input stream that can be saponified with little more than half of the caustic or lime previously required. With the instant invention, the aforementioned problems are very largely overcome, and similar benefits are to be expected from the use of the instant invention in its broader aspects to upgrade various other chemical processes that yield waste streams of dilute, strongly ionized acids.

18 Claims, 4 Drawing Figures

METHOD OF RECOVERING ACID VALUES FROM DILUTE STREAMS AND IMPROVED ALKYLENE OXIDE PROCESS USING SAME

BACKGROUND OF THE INVENTION

1. Field of the Invention

This invention relates in its broadest aspects to the concentration of dilute solutions of strongly ionized acids by the use of staged electrodialysis, and in a narrower aspect, to the improvements that can be obtained in connection with the conversion of propylene via propylene chlorohydrin to propylene oxide with the use of staged electrodialysis.

2. Description of the Prior Art

Before the adoption in recent years of relatively stringent pollution-control legislation, the disposal of something like a 1% HCl waste stream was no serious problem; it could be directly sewered, or possibly neutralized and sewered. It was obviously uneconomical to do anything else. It was known that the acid could be recovered by distillation, but only at prohibitive cost.

Electrodialysis has been known for years, chiefly as a technique useful for concentrating solutions of ionized salts. There had been developed, for example, the technique of electrodialyzing sea water (3–3.5% NaCl) to produce brine (about 21–22% NaCl). This could be done with power requirements that are not prohibitive in places like Japan where brine is not readily available from other sources. However, until recent times, such a process has usually been of rather dubious feasibility in the United States. It has been known that by electrodialysis, at least some selective migration of ions can be effected, but with respect to strongly ionized mineral acids such as hydrochloric acid, there has until now been relatively little commercial interest in the adoption of any such process, largely because it has been apparent that with the selective membranes that have until now been developed, it has been impossible to prevent the occurrence of a considerable or even an intolerable back-migration of hydrogen ions, whenever the concentration gradient between the concentrating chambers and the dilute chambers has exceeded a very modest figure, such as about 0.5 or 0.8 Normal, or in the case of hydrochloric acid, about 2 or 3 percent by weight. Those skilled in the art have long known that in such a case, electrodialysis may be conducted by using a plurality of stages of increasing concentration, but there had been no appreciation that such a practice might be of interest for the treatment of dilute mineral-acid streams to recover their acid values, and in particular, there had been no appreciation of the applicability of such a technique to a "dirty" stream containing small amounts of various organic chemicals, such as the chlorinator output in the chlorohydrin process for making propylene oxide from propylene.

The above-mentioned synthesis of propylene oxide is a commercially valuable and important chemical process, practiced in the United States to the extent of making thousands of tons per day of propylene oxide, but it is one that has also recently become increasingly less attractive because of ecological considerations. The first step, treating propylene with chlorinated water, involves the reactions $$Cl_2 + H_2O \rightarrow HCl + HOCl$$
$$HOCl + CH_3 - CH = CH_2 \rightarrow CH_3 - CHOH - CH_2Cl$$

There then follows the saponification with alkali (MOH)

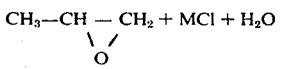

Thus, the chlorination step produces dilute hydrochloric acid mixed with the chlorohydrin (about 1.05–1.1 moles HCl per mole of chlorohydrin), and in the process step immediately following, the acid will (unless removed) react with the MOH added, making it necessary to use slightly in excess of 2 moles of MOH per mole of product, and ultimately yielding 2+ moles of byproduct MCl per mole of propylene oxide. It is apparent that the product stream, if cleansed of organic material, could be electrodialyzed to yield brine, but it has not been obvious that the rather "dirty" stream leaving the chlorinator could be electrodialyzed, making it possible to save the expense of about half of the caustic previously used and making it possible to obtain a saponifier-bottoms output correspondingly only half as salt-laden as before.

SUMMARY OF THE INVENTION

Dilute streams of mineral acid (or in a batch process, quantities of such acid) may be suitably concentrated or upgraded by the use of multi-stage electrodialysis, with the enriched stream from a first cell becoming the feed of a second, and the depleted stream of the second being used as the wash stream of the first. A suitable number of cells in serial connection are used, so that (with present membrane technology) the concentration is increased in each cell by something on the order of 0.4 to 0.8 Normal, or in the case of hydrochloric acid, 1.5 to 3.0 percent by weight. Those skilled in the art have had good reason to look away from the commercial use of any such process, inasmuch as it has generally been economically feasible to use electrodialysis on a commercial scale only when (because of the nature of the salt being electrodialyzed) very much greater concentration gradients, such as 15% by weight or more of hydrochloric acid, i.e., something like 2.8 Normal, could rather readily be achieved and maintained.

There is also the further discovery that, as one species of the invention in its broad aspect as initially outlined above, it is also possible to apply the invention to the chlorinator output in the production of propylene oxide via the chlorohydrin. In this particular case, the savings in use of caustic in the subsequent saponification step and the economic value of the recovered acid combine with power requirements that are surprisingly modest to give a substantial and unobvious improvement in the process. The invention thus also applies to the making of ethylene oxide via its chlorohydrin.

DESCRIPTION OF THE DRAWINGS

A complete understanding of the inventin may be obtained from the foregoing and following description thereof, taken together with the accompanying drawing, wherein.

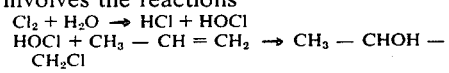

Figure 2:
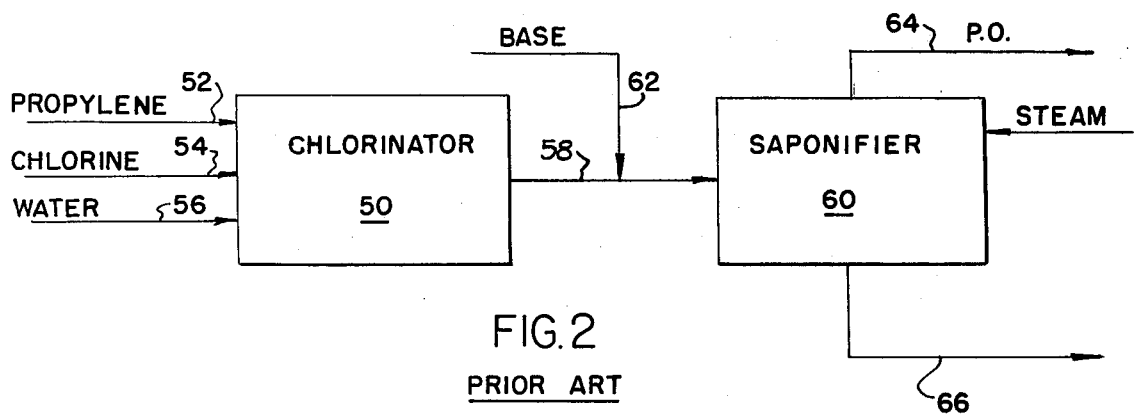
FIG. 2 is a flow diagram for a commercial process according to the prior art.
Figure 3:
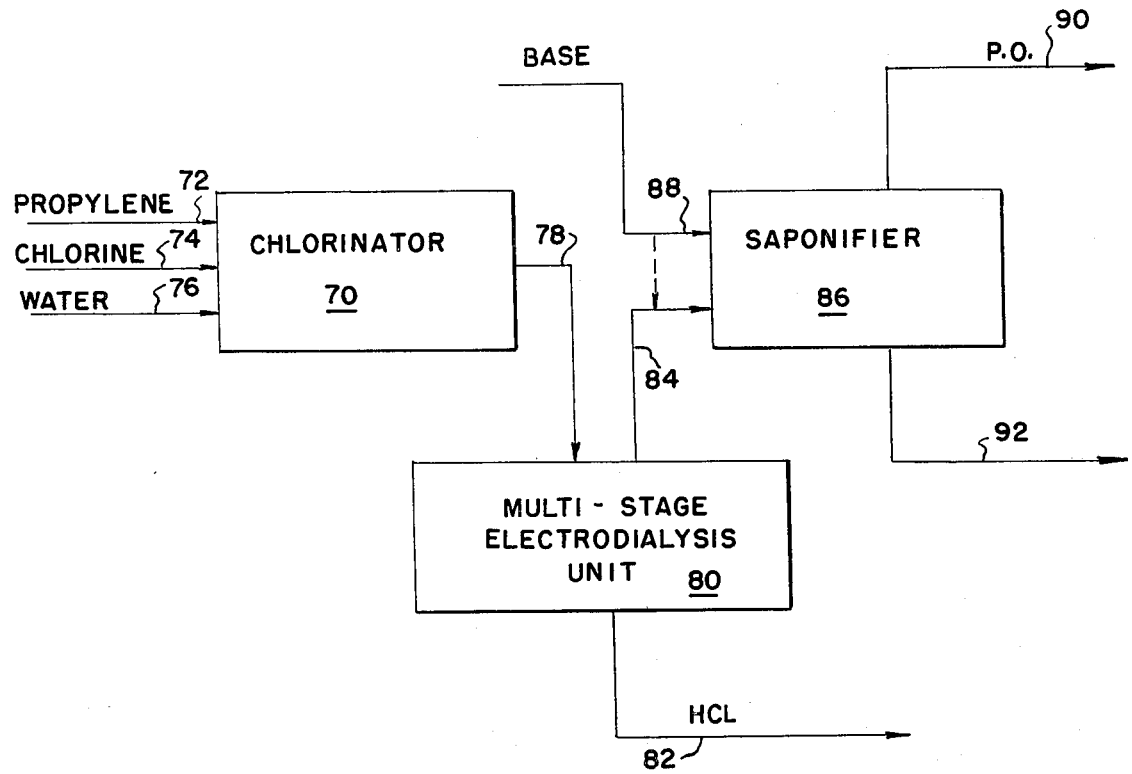
Figure 4:
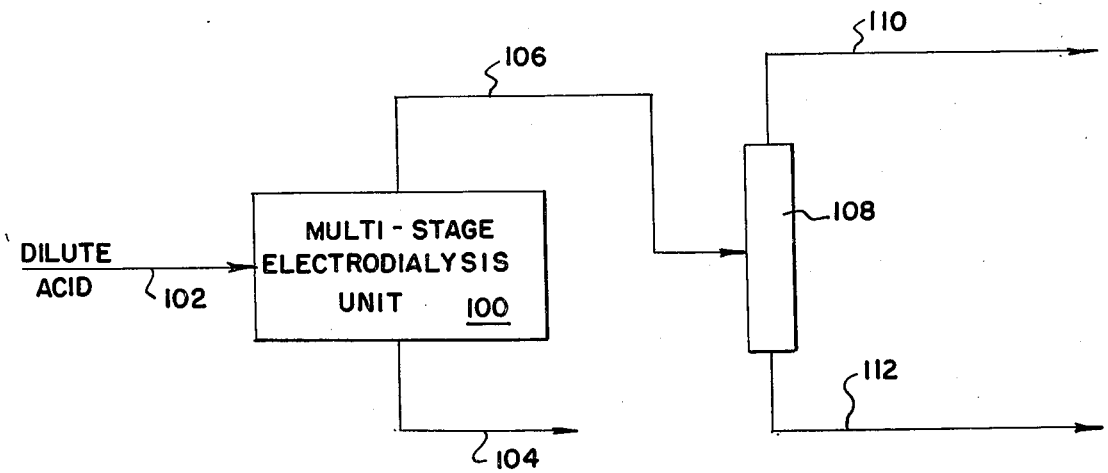

FIG. 3 is a flow diagram for the process of FIG. 2, modified in view of the teachings of the present application; and FIG. 4 is a flow diagram illustrating the use of electrodialysis in combination with subsequent distillation.

DESCRIPTION OF THE PREFERRED EMBODIMENTS

In its broadest aspects, the instant invention concerns the upgrading of streams of mineral acid by the use of electrodialysis cells that are arranged so that the electrodialysis is conducted in several stages, with the streams of one cell being connected with those of an adjacent cell or cells in an appropriate manner so that the enriched output of one cell is used for the feed of an adjacent cell that contains acid at a somewhat higher concentration, and the wash stream of a cell is derived from the depleted stream of an adjacent cell. The invention will be better understood in the light of the following brief review of the technology of electrodialysis.

Those skilled in the art are familiar with the concept of providing a container so constructed and arranged as to contain a number of membranes that are "permselective", i.e., some of them capable of passing anions but rejecting cations, and some of them capable of passing cations but rejecting anions. Suitable piping is provided to lead liquid to, and withdraw it from, the chambers between membranes. The membranes are arranged so that anion-permeable and cation-permeable membranes are alternated, and the container also encloses a pair of suitable electrodes that impose across the assembly of membranes an electrical potential. If desired, arrangements in which the cation-permeable membranes have two or more anion-permeable members between them, or vice versa, may be used. When the various compartments of such a container are filled with fluid, and a suitable potential is imposed, positively and negatively charged ions in various ones of the chambers involved are thus caused to migrate in the direction of one or the other of the two electrodes involved—anions toward the anode and cations toward the cathode. The idea of electrodialysis is that an ion of a given kind, anion or cation, will migrate from its original location only so far as it can go until it encounters a membrane of the kind that prohibits the passage of ions of the type involved. In the case of anions, this is as far as the first cation-permeable membrane. In the case of cations, it is as far as the first anion-permeable membrane. Thus, one has a container that is made up of alternating "concentrating" or "diluting" chambers.

In an electrodialysis cell operating on a continuous basis, there are four streams of material associated with the cell: (1) a feed stream entering the diluting chambers, (2) a depleted stream leaving the diluting chambers, (3) a wash stream entering the concentrating chambers, and (4) an enriched stream leaving the concentrating chambers.

Other considerations known to those skilled in the art with respect to the operation of electrodialysis cells include such matters as (1) membrane spacing, (2) selection of an appropriate impressed voltage, (3) achieving an appropriate current density level, (4) avoiding polarization, (5) selecting an appropriate concentration gradient between the concentrations prevailing in the concentrating chambers and those in the diluting chambers, and (6) obtaining a desirable level of cell efficiency in the use of the electrical power supplied.

These considerations are all somewhat interrelated. The membrane spacing should, in most instances, be as small as possible. Using a small membrane spacing reduces the voltage drop across the individual chamber and reduces the distance that an ion must travel before it has been brought into the stream in which it is removed from the electrodialysis cell. On the other hand, the membrane spacing must be sufficiently great to provide adequate residence time. The membrane spacing is usually on the order of 0.5 to 1.0 millimeters. The velocities are usually on the order of 2 to 10 centimeters per second.

The membrane spacing is related to the impressed voltage and the current-density level, and these are of course related to the level of cell efficiency. The voltage impressed must be great enough to give current densities permitting a reasonable degree of separation, and yet at the same time not be so great as to cause polarization. The impressed voltage is ordinarily on the order of 1 to 2.5 volts per chamber. The current densities are generally on the order of 3.2 to 16 amperes per square decimeter. Higher current densities generally give lower cell efficiencies. In most instances, it is desirable to achieve a cell efficiency of about 75% or greater, although in some instances, economic considerations will make it possible or even desirable to use conditions in which the current is less efficiently used. Even at cell efficiencies as low as 60% or even 50%, economically valuable results can sometimes be achieved. In pilot-scale work, there may be used 50 sets of membranes, each having a working area such as 30 square decimeters; on a commercial scale, a unit may comprise 1000 sets of membranes, each with a working area on the order of 80 or 90 square decimeters.

In electrodialysis, it is not uncommon to adjust the impressed voltage to maintain a desired level of current density, particularly in bench-scale tests on a batch basis. In such work, the voltage required to maintain a certain current density often remains fairly stable for a long while, and then starts to rise rather sharply, indicating that the dialysis is nearly complete.

There is also the matter of the concentration gradient. Those skilled in the art of electrodialyzing sea water to produce brine have found that it is possible in a single step to achieve a concentration gradient on the order of 15 to 20 weight percent: the sea water in the feed stream contains about 3 to 3.5 weight percent of sodium chloride, and the material in the concentrating chambers contains 21 to 22 weight percent of sodium chloride. There has been a tendency for those skilled in the art to look away from electrodialysis processes wherein a concentration gradient of that general magnitude cannot be achieved or maintained. In particular, relatively little work has been done on a process for electrodialyzing a dilute solution of a strong mineral acid, because it has been apparent that the achievable and maintainable concentration gradients are far smaller than those indicated above as being usual in the electrodialysis of sea water.

The efficiency of a membrane for its use in electrodialysis is sometimes described with reference to its "transport number". The "transport number" is the ratio of the wanted ions passed by the membrane to the total number of ions passed by the membrane. In other words, a perfectly "permselective" membrane performance gives a transport number of one. In some instances, such as in the commercial desalination of sea water, transport numbers (for the $Na^+$ and $Cl^-$ ions) such as 0.91 to 0.98 have been achieved. In concentrating mineral acids by electrodialysis, the efficiency is limited by the transport of hydrogen ions through the anion-permeable membranes; at concentration differences of about 1.4 Normal, the transport number for anion-permeable membranes may be as low as about 0.5. If and when membranes having higher transport numbers with respect to the concentration of mineral acids are developed, it will of course be possible to reduce the number of stages used in going from the very dilute to a desired concentration. For the present, however, it has been desirable to limit the concentration gradient within a given cell in a series of cells to about 0.2 to 0.8 Normal. This refers, of course, to the practice of the invention with the use of cells containing selective membranes of the kind now generally used for sea-water desalination and similar purposes.

Figure 1:
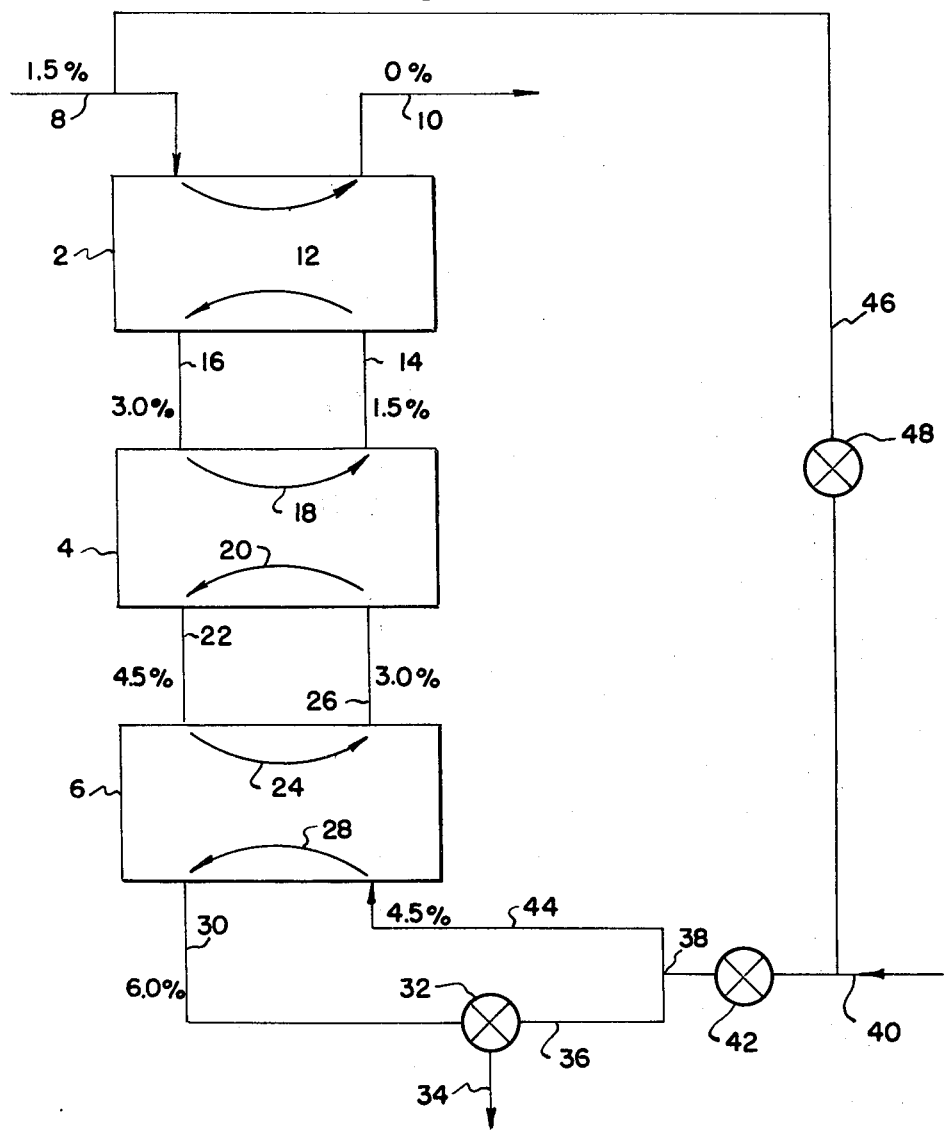
FIG. 1 is a flow diagram illustrating the use of multi-stage electrodialysis for the concentration of a dilute stream of a strongly ionizing acid.

Referring now to FIG. 1, there is shown schematically, so as to illustrate the principle of the invention, a flow chart. In FIG. 1, there is a first electrodialysis cell 2, a second electrodialysis cell 4, and third electrodialysis cell 6. For simplicity, the electrodes and the individual membranes and details of piping associated with various chambers in the cell have been omitted.

The cell 2 receives a feed stream 8 which contains 1 to 2 weight percent, for example, 1.5 weight percent of hydrochloric acid, and the stream 8 is introduced to the diluting chambers of the cell 2. The diluting chambers of the cell 2 produce, as indicated at 10, a depleted stream, which for the sake of example, is shown as containing zero percent hydrogen chloride. Actually, with membranes of the kind currently available, the stream 10 will contain about 0.2 to 0.4 weight percent, usually about 0.3 weight percent, of hydrogen chloride. Such a stream, although still in need of further processing before capable of being discharged into a stream, is nevertheless a substantial improvement over the stream 8.

The cell 2 also contains concentrating chambers, the flow into and out of which is indicated by the arrow 12. Thus, it is seen that cell 2 derives its wash stream 14 as the depleted stream of cell 4, and the concentrating chambers of cell 2 produce an enriched stream 16 that contains about 3.0 percent of hydrogen chloride. This is fed to the dilution chambers of cell 14, wherein the flow is indicated by the arrow 18. The arrow 20 indicates the flow in the concentrating chambers of cell 4. It will thus be seen that the cell 4 also operates at a concentration gradient of at most 1.5 percent, yielding a stream 22 which contains 4.5 weight percent of hydrogen chloride. This is fed to the dilution chamber of cell 6, wherein the flow is as indicated by the arrow 24, yielding a depleted stream 26 which contains about 3.0 weight percent of hydrogen chloride. In the concentrating chambers of the cell 6, there is flow as indicated by the arrow 28, so that there is produced an outlet stream 30, wherein the concentration of hydrogen chloride is 5.7 weight percent or greater, say about 6.0 percent. The stream 30 leads to a valve 32, which splits the stream 30 into lines 34 and 36. From the line 34, there is withdrawn the suitably concentrated product. The line 36 leads to a junction 38 with a supply line 40 containing a valve 42. By the line 40, water or other material low in hydrogen chloride is introduced, so that a portion of the materials of line 30 may be appropriately reused to provide the wash stream 44 for the cell 6.

As is indicated by the line 46 containing the valve 48, it will often be desirable to derive at least a part, if not all, of the necessary water for dilution of the material in stream 36 from the stream 8. This is preferable to using water or the material in stream 10, because it permits a relatively greater proportion of the material in line 30 to be taken as product through line 34.

Various other suitable modifications of the general scheme outlined above may, of course, be used. For example, it may be possible in some circumstances to use a part of one or more of the streams 14, 16, 22, or 26 to provide material for dilution of material in stream 30 to provide the wash stream 44. In some cases, suitable material for the wash stream 44 may be provided entirely from other sources, so that the entirety of the stream 30 may be diverted to the product line 34.

Skilled chemical engineers will understand how the foregoing scheme may be modified for desired purposes. It is not necessary for the cell 2 to have the same number of membranes and chambers as the cell 4 or the cell 6, and the impressed voltages may be somewhat different in the various cells. It is not necessary that the increases in hydrogen-chloride concentrations and the concentration-gradients used in each of the cells 2, 4, and 6 be the same. In general, as concentrations rise, transport numbers become somewhat lower, so that it will in some instances be desirable to take smaller step-ups in concentration in the cells containing the more concentrated acids, such as cell 6.

Economics will sometimes dictate the extent to which the concentration is to be conducted, i.e., in the case of hydrochloric acid, whether to 6 percent or 10 percent or even 25 percent by weight. An upgraded stream such as the product stream 34, at 6 percent HCl, is sometimes itself sufficiently rich in HCl to be useful for some purposes. For other uses, one must consider the final concentration desired and the cost of reaching that concentration by other means, such as distillation. It is very much less costly to obtain by distillation a concentration of 30 weight percent from the stream 34, containing 6 weight percent of HCl, than it would be to obtain it from the stream 8, which contains only 1.5 weight percent HCl.

A further example follows.

Experiments were conducted in a lab-type test cell (25 × 10 centimeters) with an effective membrane area of 124.8 square centimeters. Electrodes consisted of a platinum-plating titanium plate anode and stainless-steel sheet cathode. A two or three cell pair set-up for used for all tests.

The anion-exchange membranes were quaternary ammonium polyelectrolytes, while the cation-exchange membranes were sulfonic acid polyelectrolytes.

The feed, concentrating and rinse chambers were charged with 3,000 cubic centimeters of materials as discussed below. Recirculation of all fluid streams was imposed. The rinse chamber protecting each electrode contained dilute (2%) $H_2SO_4$, and the concentrating chamber 0.4 N HCl in all cases. The feed chamber contained either actual chlorohydrin feed stock (chlorinator product stream) of about 3.5% organics and 0.4 N HCl, or synthesized 0.4 N HCL (rest water) solutions.

The system was operated at current densities ranging from 4.3 to 12.9 amperes per square decimeter. The current efficiency was highest at 8.61 amperes per square decimeter. At that current density a current efficiency of almost 80% (79%) could be maintained with concentration differences between depleted and concentrated stream of 0.6 N. Beyond that point the current efficiency decreased rapidly. The cell pair voltage was 1.7 volts. The membrane to membrane spacing was 1.0 millimeter.

The instant invention is, of course, not limited to the concentration of hydrochloric acid but is also equally applicable to any of a number of other strongly ionizing acids such as sulfuric acid, nitric acid, phosphoric acid, hydrofluoric acid, trichloroacetic acid, and the like. An acid may be considered strongly ionizing if a 1 Normal aqueous solution thereof has a pH less than 1.5.

It is important to observe that in the multi-stage electrodialytic concentration of dilute mineral acids in accordance with this invention, the concentration gradients across a given membrane are usually not permitted to exceed about 0.6 Normal, at least with membranes having the transport-number characteristics for hydrogen-ion migration of the membranes that are now commercially available. A system wherein the wash stream is, for example, 1.2 Normal higher in acid than the feed stream that is intended to be upgraded by being caused to surrender its hydrogen ions by electrodialysis will not operate successfully; instead, hydrogen ions from the more-concentrated wash stream will back-diffuse and cause the "depleted" stream leaving the "diluting" chambers to be richer in hydrogen ions than the initial feed stream of the cell. Thus, it is very important that the concentration gradient be held to a maximum of about 0.8 Normal and preferably 0.6 Normal, at least with the present membranes. This sets, in effect, a limit on the extent to which the acid can be upgraded, comparing the feed stream of one cell with that of the next. That limit is about 2.5 weight percent with respect to hydrochloric acid, or 0.6 Normal. The limit is somewhat less in the case of cells working with acids of greater concentration, such as over about 15 Normal, and may in some instances be as low as 0.2 Normal.

It is true, moreover, that the difference in normality, comparing liquid in concentrating chambers against liquid in diluting chambers, has a considerable effect upon the efficiency of the cell in terms of its use of electric power. For example, a gradient of 0.8 Normal may yield a cell efficiency of only 40 or 45%, and a gradient of 1.0 Normal may yield a cell efficiency of only 20 or 30%.

Although those skilled in the art will naturally be led to look away from any scheme requiring a great number of cells in series, not only because of the initial expense but also because of the costs of maintaining and operating such a greater number of cells, we have nevertheless surprisingly discovered that such a scheme may be practical. The power requirements for the instant invention are relatively low. The advantage of having a co-product of some recognizable economic value, in place of a stream that imposes an economic burden for its disposal, tends to make the instant invention surprisingly advantageous.

The great usefulness of the present invention, in at least one instance, is evident from the following description of its application to the problem of improving the known commercial process of converting propylene to propylene oxide via the chlorohydrin route. In FIG. 2, there is illustrated the prior-art scheme for this conversion. To a chlorinator 50, there are led lines 52, 54, and 56, supplying propylene, chlorine, and water, respectively. The output of the chlorinator 50 is led by the line 58 to a saponifier 60, to which base is supplied by the line 62. In the saponifier, the propylene chlorohydrin and the hydrochloric acid in the material in the line 58 are saponified and neutralized, respectively by the base supplied by line 62. Under the influence of steam there is withdrawn as overhead (stripped) from the saponifier through the line 64 the desired product, propylene oxide, which is purified via further distillation (other organics and water removed), and there is also produced a waste stream 66, containing substantial quantities of sodium chloride or the like.

The prior-art scheme of FIG. 2 is to be compared with that according to the instant invention, which is illustrated in FIG. 3. As before, there is a chlorinator 70, to which propylene, chlorine, and water, respectively, are fed by the lines 72, 74, and 76. In this case, however, the chlorinator output stream 78 is fed to a multistage electrodialysis unit 80, and in particular, to the diluting chambers of the cell therein that contains the most dilute acid. From the unit 80, there is withdrawn a stream 82 containing upgraded (enriched), dilute aqueous hydrochloric acid, essentially organic-free. This material is derived from the enriched stream of the cell in the unit 80 that has the highest acid concentration. There is also drawn from the unit 80 a stream 84 suitably depleted in hydrochloric acid and containing essentially all the organics. This is, for example, the depleted stream of the cell in unit 80 wherein the acid is most dilute. The stream 84 is fed to the saponifier 86, to which a base is fed through the line 88. Propylene oxide is withdrawn as overhead through the line 90, and there is, as before, a saponifier-bottoms line or stream 92.

With this scheme, the hydrochloric acid content of the material in the line 84 entering the saponifier 86 is on the order of 0.3 to 0.4 percent by weight, instead of 1.5 to 2.0 percent by weight, and consequently, the amount of base required to be supplied by the line 88 is remarkably reduced, and the salt content in the material leaving the saponifier via line 92 is correspondingly reduced. Though according to the prior-art scheme of FIG. 2, it was usually necessary to add about 2 equivalents of base per equivalent of chlorohydrin, it becomes possible with the instant invention to use considerably less base, usually on the order of slightly over 1 equivalent and in any event not more than about 1.5 equivalents of base per equivalent of chlorohydrin.

We have surprisingly found that (1) a multi-stage electrodialysis unit such as the unit 80 can be made which will accommodate the organic impurities that are present in the material in lines such as the line 78; (2) that with an appropriate unit 80, the recovery of a very substantial portion of the hydrochloric acid values of the material in the line 78 is indeed practical; and (3) that the power requirements for operating the unit 80 are sufficiently low that, considering the economic value of the recovered hydrochloric acid (line 82) and considering the saving in the process because of supplying lesser amounts of base (not over 1.5 equivalents per equivalent of chlorohydrin, and often much less, such as 1.05 equivalents per 1 equivalent of chlorohydrin) through the line 88, the changes in the process outlined above afford a distinct economic advantage. Beyond that, there is the environmental or economic advantage obtained because of the lower salt content in the material leaving the saponifier via line 92.

According to calculations performed by employees of the applicant's assignee, it requires considerably less energy per unit of hydrochloric acid produced (anhydrous basis) if the concentration from an aqueous solution, 1.5 weight percent of acid, to an aqueous solution, 6.0 weight percent of acid, is done by electrodialysis as opposed to being done by distillation. Such calculations indicate a requirement of 24,000 kilowatt-hours per 891 kg. for distillation, versus 1500 kilowatt-hours for the same quantity of product, obtained by electrodialysis. Of course, distillation becomes increasingly less disadvantageous as the strength of the dilute-acid feed material employed increases. It will, accordingly, in some instances be desirable to use the electrodialysis approach only for concentrating a dilute hydrochloric acid stream until it is upgraded so that it contains, for example, 5.0 to 7.0 weight percent of acid, or about 1.5 to 1.7 Normal, and the upgraded material obtained by electrodialysis is then further concentrated by distillation to some desired extent, such as 15 percent by weight of acid (4 Normal) or greater. This concept is illustrated in FIG. 4, in which a multi-stage electrodialysis unit 100 is fed with a stream 102 of dilute acid, and there is withdrawn from the unit 100 a waste stream 104 and a product stream 106, enriched in strongly ionizing acid to a suitable degree, as discussed above. The stream 106 is led to a distillation tower 108, from which a product stream 110 having a desired high content of acid and a waste stream 112 are withdrawn. (In the case of a strongly ionizing acid boiling above the boiling point of water, the overhead stream is the waste stream, and the bottoms stream is the product). It is well within the skill of the art to select suitable equipment and conditions for the operation of the distillation tower 108, whereby the electrodialysis-upgraded stream 106 is further concentrated to a practical and desired extent.

EXAMPLE

The chlorinator of a process for producing propylene oxide from propylene via propylene chlorohydrin has output consisting essentially of 428,511 kg. per hour of water, 6,056 kg. per hour of hydrochloric acid, 14,431 kg. per hour of propylene chlorohydrin, 880 kg. per hour of propylene dichloride, and 496 kg. per hour of other organic and inorganic materials. This output stream is fed to an electrodialysis cell forming a part of a multi-stage electrodialysis unit, such as the unit 80 mentioned above. As indicated above, there is withdrawn from the unit 80, as indicated by the line 82, a stream of material enriched in hydrochloric acid, namely, at a rate of 4,238 kg. per hour of hydrochloric acid and 66,417 kg. per hour of water.

Also withdrawn from the unit 80 is a stream such as the stream 84, which may consist, for example, of 362,094 kg. per hour of water, 1,817 kg. per hour of hydrochloric acid, 14,431 kg. per hour of propylene chlorohydrin, 880 kg. of propylene dichloride, and 496 kg. per hour of other organics and inorganics, or a total of 379,718 kg. per hour.

This material is initially treated in a chlorohydrin run tank to which 7,013 kg. per hour of scrubber water are added, along with 22,649 kg. per hour of brine muds (bottoms of brine flocculators), consisting of 4,975 kg. per hour of sodium chloride, 9 kg. per hour of sodium hydroxide, 14,954 kg. per hour of water, 2,492 kg. per hour of calcium carbonate, 93 kg. per hour of sodium sulfate, and 126 kg. per hour of other inorganics. The use of such brine muds is optional. From the chlorohydrin run tank, there are withdrawn 1,095 kg. per hour of carbon dioxide. There is also withdrawn and sent to a saponifier liming tower a saponifier feed totaling 408,285 kg. per hour, consisting of 14,431 kg. per hour of propylene chlorohydrin, 4,984 kg. per hour of sodium chloride, 2,765 kg. per hour of calcium chloride, 230 kg. per hour of other inorganics, 880 kg. per hour of propylene dichloride, 485 kg. per hour of other organics, and 384,510 kg. per hour of water.

Also fed to the saponifier liming tower is a "weak cell liquor" stream totaling 58,300 kg. per hour and consisting of 42,139 kg. per hour of water, 9,357 kg. per hour of sodium chloride, 6,454 kg. per hour of sodium hydroxide, and 350 kg. per hour of other inorganics. The liming tower is supplied with 44,226 kg. per hour of steam. From the liming tower there is withdrawn overhead a saponifier product totaling 10,242 kg. per hour and consisting of 8,574 kg. per hour of propylene oxide, 875 kg. per hour of propylene dichloride, 680 kg. per hour of water, and 113 kg. of other organics. There was also withdrawn from the liming tower a saponifier-bottoms stream totaling 500,569 kg. per hour, consisting of 23,270 kg. per hour of sodium chloride, 3,344 kg. per hour of other inorganics, 348 kg. per hour of sodium hydroxide, 16 kg. per hour propylene oxide, 5 kg. per hour propylene dichloride, 735 kg. per hour of other inorganics, and 472,851 kg. per hour of water.

In connection with the above operation, there is used a multi-stage electrodialysis unit comprising three stages, each of the stages being made up of six electrodialysis modules, each module comprising 1000 membranes of anion-permeable material such as quaternary ammonium polyelectrolytes and 1000 membranes of cation-permeable material such as sulfonic acid polyelectrolytes, with the membranes having a spacing of 0.5 millimeter. The cathodes are made of stainless steel, and the anodes are made of platinum-clad titanium, and the impressed voltage between the cathode and the anode is 1100 volts.

The above-mentioned membranes, anodes, and cathodes each have an area of about 93 square decimeters and the flow of current is about 800 amperes, for a current density of 8.611 amperes per square decimeter. The cell efficiency, overall, is about 75 percent.

It will be observed that the weak cell liquor provides about 1.05 equivalents of sodium hydroxide per equivalent of propylene chlorohydrin. This is a distinct improvement over the prior-art practices, according to which at least 2.0 equivalents of sodium hydroxide would have been needed for each equivalent of propylene chlorohydrin. At the same time, there is produced a hydrochloric acid steam that is capable of being upgraded to a desired strength, such as 15 percent for pickling use, by subsequent distillation.

While we have shown and described herein certain embodiments of our invention, we intend to cover as well any change or modification therein which may be made without departing from its spirit and scope.

We claim:

1. A method for recovering values of strongly ionizing acid from a dilute stream containing said acid, said method comprising leading said dilute stream as feed to diluting chambers of a low-concentration stage of a multiple-stage electrodialysis unit, said multiple-stage electrodialysis unit comprising a plurality of stages, said stages being operated at different levels of concentration of acid, each of said stages comprising a plurality of cells, said cells containing a plurality of alternated cation-permeable and anion-permeable membranes so spaced apart as to provide between them a plurality of alternating concentrating chambers and diluting chambers, concentrating chambers of said cells having wash streams entering said concentrating chambers and enriched streams leaving said concentrating chambers, diluting chambers of said cells having feed streams entering said diluting chambers and depleted streams leaving said diluting chambers, the cells of a stage of lower average hydrogen-ion concentration being operatively connected with the cells of a stage of higher average hydrogen-ion concentration in such a manner that the depleted streams of the cells of said stage of higher average hydrogen-ion concentration form the wash streams of cells of said stage of lower average hydrogen-ion concentration, and the enriched streams of said cells of lower average hydrogen-ion concentration form the feed streams of said cells of high average hydrogen-ion concentration, a stream low in values of said strongly ionizing acid being withdrawn from said multi-stage electrodialysis unit, said stream low in values of said strongly ionizing acid being obtained by combining depleted streams of cells of a stage of low average hydrogen-ion concentration, and a stream rich in values of said strongly ionizing acid being withdrawn from said multi-stage electrodialysis unit, said stream rich in values of said strongly ionizing acid being obtained by combining enriched streams of the cells of a stage of high average hydrogen-ion concentration, each of said cells comprising one of said stages being operated under conditions such that the difference in hydrogen-ion concentration between liquid in concentrating chambers of a cell and liquid in diluting chambers of the same cell does not exceed 0.8 Normal.

2. A method as defined in claim 1, wherein said strongly ionizing acid is hydrochloric acid.

3. A method as defined in claim 1, characterized in that each of said cells is operated with a membrane to membrane spacing of about 0.5 to 1.0 millimeter, a current density of 3.2 to 16 amperes per square decimeter, and an impressed voltage of 1 to 2.5 volts per chamber, and under conditions yielding a current efficiency in excess of 60%.

4. A method as defined in claim 3, wherein said strongly ionizing acid is hydrochloric acid.

5. A method as defined in claim 4, further characterized in that said hydrochloric acid in said dilute stream comprising said acid in initially at a concentration of approximately 1 to 2 weight percent of said acid, dilute material issuing from said stage in which the average hydrogen-ion concentration is the lowest contains 0.2 to 0.4 weight percent of hydrochloric acid, and material withdrawn as product from the enriched stream of the said stage in which the average hydrogen-ion concentration is the greatest contains 5.7 weight percent or more of hydrochloric acid.

6. In a method of producing alkylene oxide selected from the group consisting of ethylene oxide and propylene oxide from a corresponding unsaturated hydrocarbon by reacting said hydrocarbon with hypochlorous acid to form a corresponding alkylene chlorohydrin and then saponifying said alkylene chlorohydrin with base material to form said alkylene oxide, said chlorohydrin being produced as an aqueous stream containing about 3 to 10 weight percent of chlorohydrin, organic impurities, and a small but substantial proportion of hydrochloric acid, the improvement comprising subjecting said stream to the action of a multi-stage electrodialysis unit comprising a plurality of electrodialytic cells containing a plurality of spaced-apart anion-permeable and cation-permeable membranes so as to provide a plurality of concentrating and diluting chambers therein, the hydrogen-ion concentration in liquid in said concentrating chambers not exceeding the hydrogen-ion concentration in liquid in said diluting chambers by more than 0.4 to 0.8 Normal, the hydrogen-ion concentration in enriched liquid withdrawn from one of said cells not exceeding the hydrogen-ion concentration in material fed to said one of said cells by more than about 0.4 to 0.8 Normal, said multi-stage electrodialysis unit producing a first stream enriched in hydrochloric acid and a second stream depleted in hydrochloric acid values, said second stream being saponified to yield said alkylene oxide by being reacted with not more than about 1.5 equivalents of said base material per equivalent of alkylene chlorohydrin.

7. An improvement as defined in claim 6, characterized in that said alkylene oxide is propylene oxide.

8. An improvement as defined in claim 6, characterized in that said alkylene oxide is ethylene oxide.

9. In a method of producing alkylene oxide selected from the group consisting of ethylene oxide and propylene oxide from a corresponding unsaturated hydrocarbon by reacting said hydrocarbon with hypochlorous acid to form a corresponding alkylene chlorohydrin and then saponifying said alkylene chlorohydrin with base material to form said alkylene oxide, said chlorohydrin being produced as an aqueous stream containing about 3 to 10 weight percent of chlorohydrin, organic impurities, and a small but substantial proportion of hydrochloric acid, the improvement comprising subjecting said stream to the action of a multi-stage electrodialysis unit comprising leading said dilute stream as feed to diluting chambers of a low-concentration stage of a multiple-stage electrodialysis unit, said multiple-stage electrodialysis unit comprising a plurality of stages, said stages being operated at different levels of concentration of acid, each of said stages comprising a plurality of cells, said cells containing a plurality of alternated cation-permeable and anion-permeable membranes so spaced apart as to provide between them a plurality of alternating concentrating chambers and diluting chambers, concentrating chambers of said cells having wash streams entering said concentrating chambers and enriched streams leaving said concentrating chambers, diluting chambers of said cells having feed streams entering said diluting chambers and depleted streams leaving said diluting chambers, the cells of a stage of lower average hydrogen-ion concentration being operatively connected with the cells of a stage of higher average hydrogen-ion concentration in such manner that the depleted streams of the cells of said stage of higher average hydrogen-ion concentration form the wash streams of cells of said stage of lower average hydrogen-ion concentration, and the enriched streams of said cells of lower average hydrogen-ion concentration form the feed streams of said cells of higher average hydrogen-ion concentration, a stream low in values of said hydrochloric acid being withdrawn from said multi-stage electrodialysis unit, said stream low in values of said hydrochloric acid being obtained by combining depleted streams of cells of a stage of low average hydrogen-ion concentration, and a stream rich in values of said hydrochloric acid being withdrawn from said multi-stage electrodialysis unit, said stream rich in values of said hydrochloric acid being obtained by combining enriched streams of the cells of a stage of high average hydrogen-ion concentration, each of said cells comprising one of said stages being operated under conditions such that the difference in hydrogen-ion concentration between liquid in concentrating chambers of a cell and liquid in diluting chambers of the same cell does not exceed 0.8 Normal, said stream low in values of said hydrochloric acid withdrawn from said multi-stage electrodialysis unit being then saponified to yield said alkylene oxide by being reacted with not more than 1.5 equivalents of said base material per equivalent of said alkylene chlorohydrin.

10. An improvement as defined in claim 9, characterized in that each of said cells is operated with a membrane to membrane spacing of about 0.5 to 1.0 millimeter, a current density of 3.2 to 16 amperes per square decimeter, and an impressed voltage of 1 to 2.5 volts per chamber, and under conditions yielding a current efficiency in excess of 60%.

11. An improvement as defined in claim 10, characterized in that said alkylene oxide is propylene oxide.

12. An improvement as defined in claim 10, characterized in that said alkylene oxide is ethylene oxide.

13. A method as defined in claim 1, characterized in that said dilute stream is subjected to concentration by electrodialysis to produce a stream about 1.5 to 1.7 Normal in said acid, and said stream is then further upgraded by distillation.

14. A method as defined in claim 13, wherein said strongly ionizing acid is hydrochloric.

15. A method as defined in claim 13, characterized in that each of said cells is operated with a membrane to membrane spacing of about 0.5 to 1.0 millimeter, a current density of 3.2 to 16 amperes per square decimeter, and an impressed voltage of 1 to 2.5 volts per chamber, and under conditions yielding a current efficiency in excess of 60%.

16. In a method of producing alkylene oxide selected from the group consisting of ethylene oxide and propylene oxide from a corresponding unsaturated hydrocarbon by reacting said hydrocarbon with hypochlorous acid to form a corresponding alkylene chlorohydrin and then saponifying said alkylene chlorohydrin with base material to form said alkylene oxide, said chlorohydrin being produced as an aqueous stream containing about 3 to 10 weight percent of chlorohydrin, organic impurities and a small but substantial portion of hydrochloric acid, the improvement comprising subjecting said stream to the action of an electrodialysis unit comprising a plurality of electrodialytic cells containing a plurality of spaced-apart anion-permeable and cation-permeable membranes so as to provide a plurality of concentrating and diluting chambers therein, said electrodialysis unit producing a first stream enriched in hydrochloric acid and a second stream depleted in hydrochloric acid values, said second stream being saponified to yield said alkylene oxide by being reacted with not more than about 1.5 equivalents of said base material per equivalent of alkylene-chlorohydrin.

17. An improvement as defined in claim 16, characterized in that said alkylene oxide is propylene oxide.

18. An improvement as defined in claim 16, characterized in that said alkylene oxide is ethylene oxide.

* * * * *